No. 699,027. Patented Apr. 29, 1902.
O. V. SIGURDSSON & H. BURTLES.
TIME LAMPLIGHTER.
(Application filed Sept. 11, 1900.)

(No Model.) 4 Sheets—Sheet 1.

Witnesses:
P. F. Sonnek.
[signature]

Inventors:
Oddur Vigfus Sigurdsson
and Henry Burtles
by [signature] attys.

THE NORRIS PETERS CO., PHOTO-LITHO., WASHINGTON, D. C.

No. 699,027. Patented Apr. 29, 1902.
O. V. SIGURDSSON & H. BURTLES.
TIME LAMPLIGHTER.
(Application filed Sept. 11, 1900.)

(No Model.) 4 Sheets—Sheet 2.

No. 699,027. Patented Apr. 29, 1902.
O. V. SIGURDSSON & H. BURTLES.
TIME LAMPLIGHTER.
(Application filed Sept. 11, 1900.)
(No Model.) 4 Sheets—Sheet 4.

UNITED STATES PATENT OFFICE.

ODDUR V. SIGURDSSON AND HENRY BURTLES, OF LONDON, ENGLAND.

TIME-LAMPLIGHTER.

SPECIFICATION forming part of Letters Patent No. 699,027, dated April 29, 1902.

Application filed September 11, 1900. Serial No. 29,637. (No model.)

*To all whom it may concern:*

Be it known that we, ODDUR VIGFUS SIGURDSSON, a subject of the King of Denmark, and HENRY BURTLES, a subject of the Queen of Great Britain, both residing at London, England, have invented certain new and useful Improvements in Time Lamp Lighters and Extinguishers, of which the following is a full, clear, and exact description, and for which we have made application for patent in Great Britain, dated March 19, 1900.

The invention has for its object means for automatically turning gas on and off at predetermined times.

In factories and other places where it is desired to turn on gas at given times for heating or lighting purposes it has heretofore been customary for an employee to go around and light the various gas-jets, and where such are required for heating purposes—such, for instance, as for heating the metal-pots of linotype and type-founding machines—delays in commencing work were liable to occur through neglect in lighting the gas-jets sufficiently early.

Now according to our invention we are enabled to cause the full supply of gas to be automatically turned on or off at predetermined times by means of clockwork apparatus which can be set to turn on or off the main gas-tap at any given time.

We will describe our invention by the aid of the accompanying drawings, in which—

Figure 1:
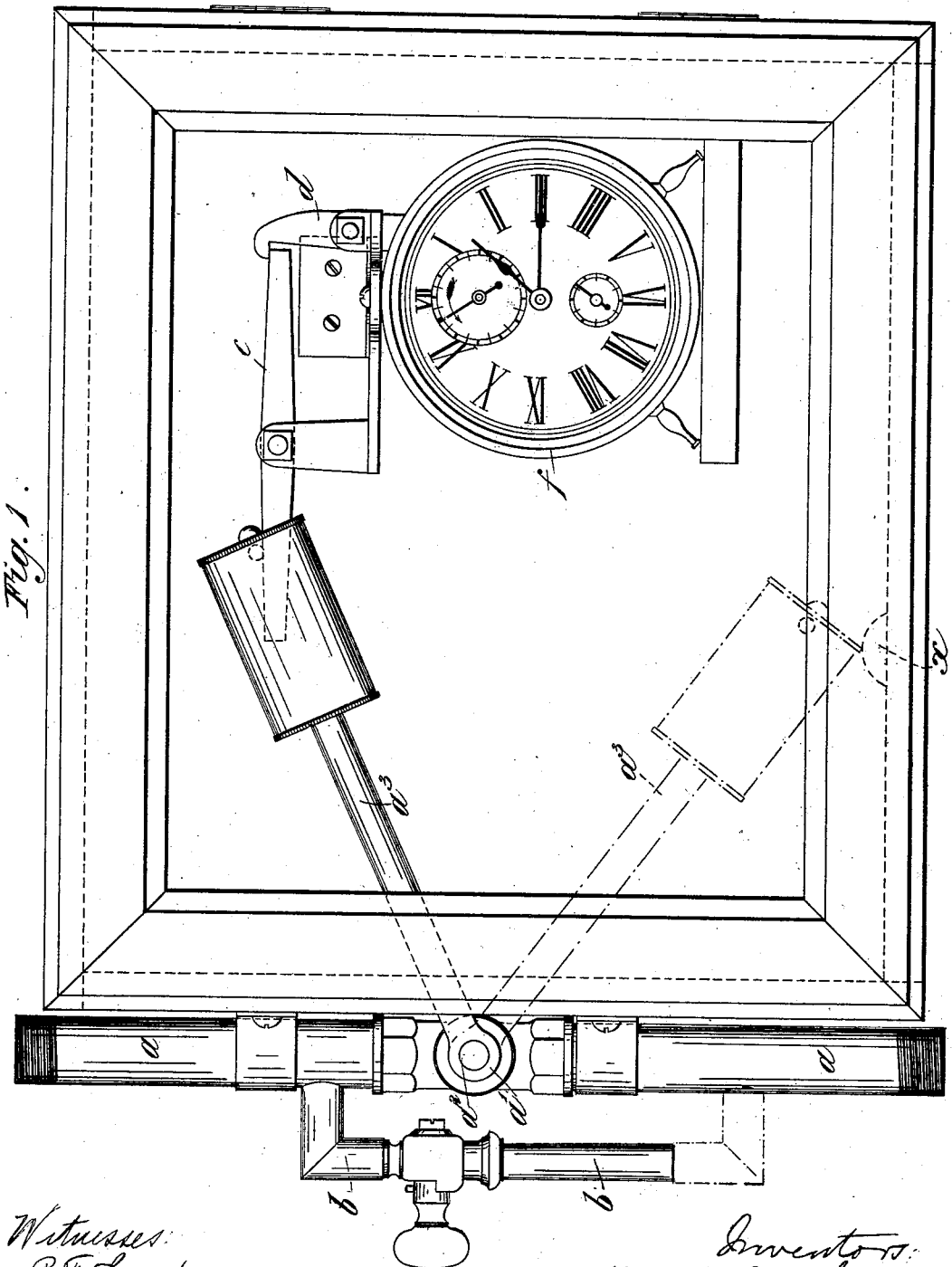
Figure 2:
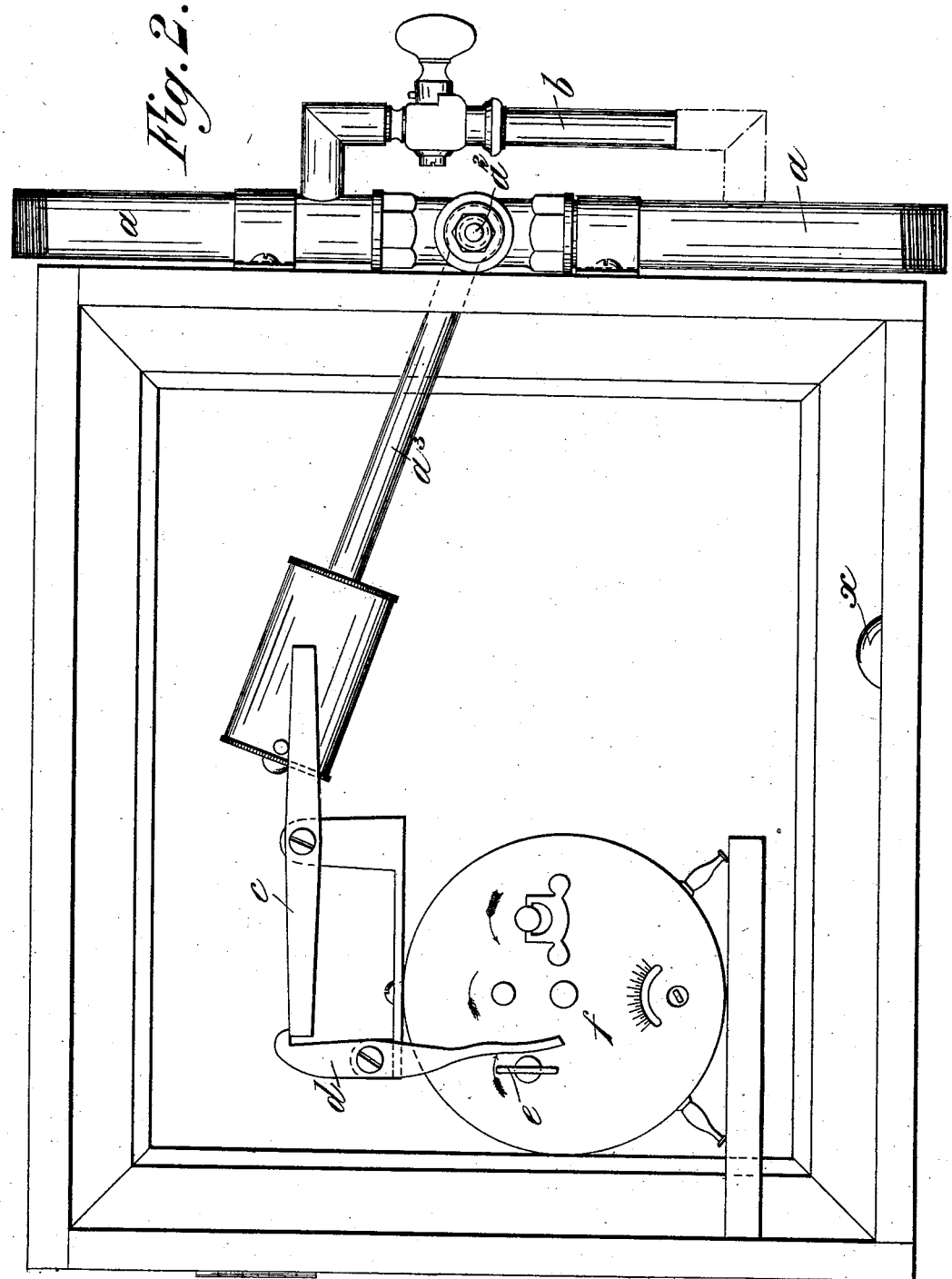
Figure 3:
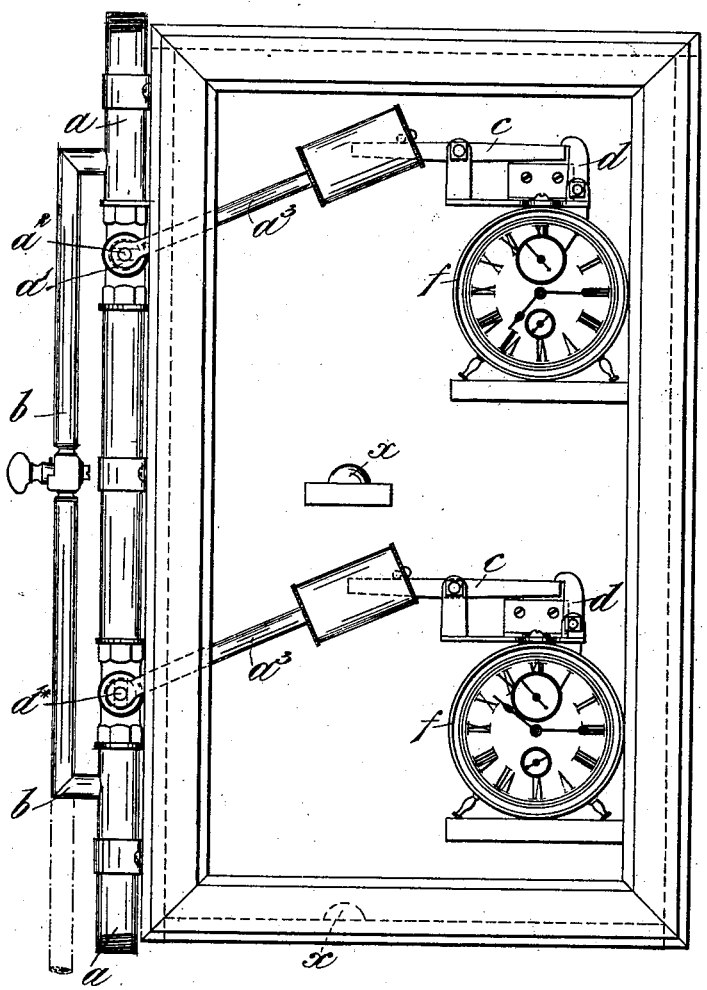
Figure 4:
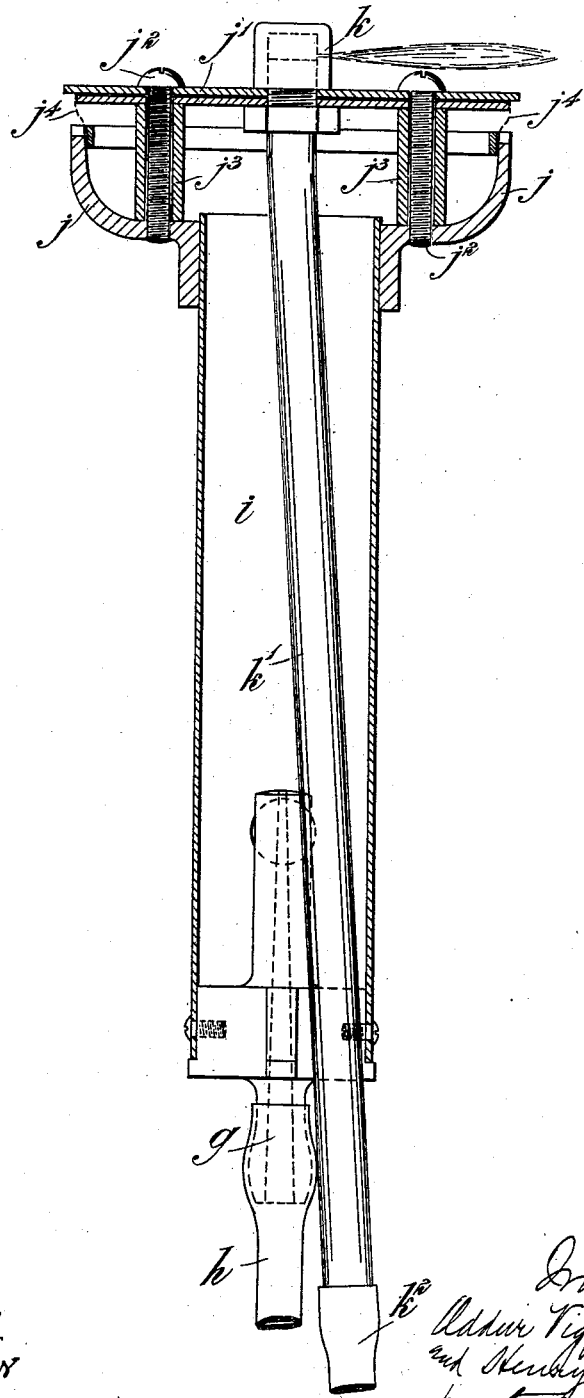

Figure 1 is a front view, and Fig. 2 a back view, of means arranged according to our invention for automatically turning gas on at predetermined times. Fig. 3 is a front view of means arranged according to our invention for automatically turning gas on and off at predetermined times, and Fig. 4 is a longitudinal section of a modified form of Bunsen burner suitable to be used in combination with such automatic apparatus.

In all the figures like parts are indicated by similar letters of reference.

We will first describe the apparatus shown at Figs. 1 and 2 as applied to a linotype or type-founding machine. $a$ is the main gas-pipe to convey gas to the Bunsen burners used to heat the metal-pots. $b$ is a smaller or by-pass pipe to convey gas to the pilot-burners. The pipe $a$ is fitted with a tap $a'$, the plug $a^2$ of which has fixed thereon a lever $a^3$, provided with a weight $a^4$ and pin $a^5$, which can be held up in its closed or shut-off position by one end of a double-ended supporting-lever $c$, passing under said pin $a^5$, the other end of which lever is held by a double-armed catch-lever $d$, capable of being liberated from such double-ended lever $c$ by the action of a cam or striker $e$, operated by the alarm portion of a clockwork mechanism $f$. The levers $c$ and $d$ are pivoted to brackets $l'$ and $l^2$, carried by the base-plate $l$, attached to the clock-casing $f'$. $x$ is a soft cushion to receive the weighted lever $a^3$ when it falls.

In the apparatus shown the clockwork mechanism $f$ is of similar character to an ordinary alarm-clock, except that the alarm bell and hammer are removed, and the cam or striker $e$ is the alarm-winder, which alarm can in some cases be arranged to go for twenty-four hours instead of twelve hours. The clockwork, like any ordinary alarm-clock, is capable of being set to act at any given time, and thereby to liberate the weighted lever at the time desired. Thus on the arrival of the time at which the alarm-clockwork is set to act the cam or striker $e$ acts on the lower end of the double-armed catch-lever $d$, and thereby moves its upper end away from the double-ended supporting-lever $c$, which then allows the weighted lever $a^3$ to fall, and thereby turn on the full supply of gas for the Bunsen burners.

In linotype-machines as at present in use an employee turns on the gas for and lights each Bunsen burner separately or the gas is left on all night or day. In such case no pilot-flame is needed; but when automatically turning on the gas according to our present invention a pilot-flame is required, and it has been found necessary to employ means to prevent the "lighting back" of the gas to the point of issue from the gas-nozzle to the mixing-chamber of the Bunsen burner.

The ordinary Bunsen burner used in linotype-machines modified as above mentioned is represented at Fig. 4. $g$ is the gas-nozzle, the lower end of which is, as usual, connected by a flexible tube $h$ to a branch from the main gas-pipe $a$. $i$ is the mixing-chamber, $j$ is the body, and $j'$ the cover, of the burner proper. $k$ is the pilot-flame burner, receiving its supply of gas from the pipe $k'$, passing through the mixing-chamber $i$, and connected by flexible tubing $k^2$ with a branch from the pipe $b$. Ordinarily the cover $j'$ of the burner fits closely on the indented edge of burner-body $j$; but, as shown, we now fix it at a certain distance above such indented edge by means of screws $j^2$, passing through distance-tubes $j^3$ and screwing into the bottom of the burner-body $j$, and we inclose the space between the body and cover by a ring $j^4$, of wire-gauze. The mixture of gas and air will pass through the wire-gauze and be burned on the outside thereof; but the flame will be unable to pass back through the wire-gauze.

If desired, the apparatus shown in Figs. 1 and 2 may be used to turn on the main gas-supply when the gas is used for lighting purposes. In such case the small pipe $b$ is connected to the main gas-pipe $a$ at both sides of the gas-tap $a'$, as shown by the broken lines.

We will now describe the arrangement shown at Fig. 3 whereby the main gas-supply can be turned on and off at predetermined times. In this case the main gas-pipe $a$ is provided with a tap $a'$ and another tap $a'^*$. The holes through the plugs of these taps are arranged at right angles to each other, and each plug has fixed thereto a weighted lever $a^3$, which is retained in its raised position and liberated therefrom by a double-ended supporting-lever, catch-lever, and clockwork of similar character to those hereinbefore referred to. Thus when the weighted levers $a^3$ of the taps $a'$ $a'^*$ are in their raised position the tap $a'$ is turned off and the tap $a'^*$ is turned on. Then at the predetermined time the lever $a^3$ of the tap $a'$ is liberated by the alarm-clockwork, and said tap $a'$ is turned on, thereby enabling the gas to pass freely along the main gas-pipe $a$. Then when the predetermined time has arrived the alarm-clockwork will liberate the weighted lever $a^3$ of the tap $a'^*$, and thereby close the main passage through the main gas-pipe $a$. At all times, however, gas can pass by the by-pass or small pipe $b$ to constantly maintain a pilot-flame to each burner.

It will be evident that when the apparatus is used only for lighting purposes the by-pass can be provided by a small passage in the tap $a'$, which cannot be closed by the rotation of the plug.

Instead of using a weighted lever fixed on the tap-plug a spring-actuated lever may be employed.

Having fully described our invention, what we claim, and desire to secure by Letters Patent, is—

1. In means for automatically turning gas on or off at predetermined times, the combination of a main gas-pipe, a cock on said pipe, a falling lever attached to the plug of the cock on the main gas-pipe, a weight on the outer end of said lever, a pin carried by said weight, a double-ended supporting-lever, one arm of which acts to support the weighted end of the falling lever by means of said pin, a bracket to which the double-ended supporting-lever is pivoted, a base-plate carrying the said bracket, a clock-casing to which the base-plate is fastened, a double-armed catch-lever, one end of which acts to hold the other arm of such double-ended supporting-lever, another bracket carried by the said base-plate, to which such double-armed lever is pivoted, a cam or striker to act upon the other end of the catch-lever so as to release the double-ended supporting-lever, and a winder upon which such cam or striker is mounted, substantially as herein set forth.

2. In an apparatus for turning gas on or off at predetermined times, the combination of the gas-cock $a'$ $a^2$, the lever $a^3$ mounted thereon for automatically closing or opening said cock, the weight $a^4$ on said lever and the pin $a^5$ projecting therefrom, the double-ended supporting-lever $c$, the double-armed catch-lever $d$ detaining said supporting-lever, the brackets $l'$, $l^2$ to which such levers $c$ and $d$ are pivoted, the base-plate $l$ carrying such brackets $l'$ $l^2$, the clock-casing $f$ to which such base-plate is attached, and the striker $e$ mounted on the winding-arbor of an alarm-clock movement of common form for retracting said catch-lever $d$ to release the supporting-lever $c$, substantially as set forth.

In testimony whereof we affix our signatures in presence of two witnesses.

O. V. SIGURDSSON.
HENRY BURTLES.

Witnesses:
CLAUDE K. MILLS,
WM. GIRLING.